US007974460B2

(12) United States Patent
Elgersma

(10) Patent No.: US 7,974,460 B2
(45) Date of Patent: Jul. 5, 2011

(54) METHOD AND SYSTEM FOR THREE-DIMENSIONAL OBSTACLE MAPPING FOR NAVIGATION OF AUTONOMOUS VEHICLES

(75) Inventor: Michael R. Elgersma, Plymouth, MN (US)

(73) Assignee: Honeywell International Inc., Morristown, NJ (US)

(*) Notice: Subject to any disclaimer, the term of this patent is extended or adjusted under 35 U.S.C. 154(b) by 1151 days.

(21) Appl. No.: 11/671,755

(22) Filed: Feb. 6, 2007

(65) Prior Publication Data

US 2008/0189036 A1 Aug. 7, 2008

(51) Int. Cl.
*G06K 9/00* (2006.01)
*G06K 9/62* (2006.01)
*G06K 9/32* (2006.01)
*G06K 9/36* (2006.01)

(52) U.S. Cl. ........ 382/153; 382/104; 382/284; 382/157; 382/293; 701/301

(58) Field of Classification Search ................. 382/103, 382/104, 107, 153, 154, 157, 284, 293–295; 701/301
See application file for complete search history.

(56) References Cited

U.S. PATENT DOCUMENTS

| 4,219,812 | A | * | 8/1980 | Rittenbach | 342/110 |
|---|---|---|---|---|---|
| 4,783,753 | A | * | 11/1988 | Crimmins | 382/275 |
| 4,984,279 | A | * | 1/1991 | Kidney et al. | 382/113 |
| 5,101,351 | A | * | 3/1992 | Hattori | 701/27 |
| 5,122,957 | A | * | 6/1992 | Hattori | 701/27 |
| 5,361,127 | A | * | 11/1994 | Daily | 356/3.02 |
| 5,436,839 | A | * | 7/1995 | Dausch et al. | 701/27 |
| 5,777,690 | A | * | 7/1998 | Takeda et al. | 348/699 |
| 5,793,900 | A | * | 8/1998 | Nourbakhsh et al. | 382/263 |
| 6,005,961 | A | * | 12/1999 | Na | 382/113 |
| 6,130,705 | A | * | 10/2000 | Lareau et al. | 348/144 |
| 6,154,558 | A | * | 11/2000 | Hsieh | 382/103 |
| 6,307,959 | B1 | * | 10/2001 | Mandelbaum et al. | 382/154 |
| 6,456,728 | B1 | * | 9/2002 | Doi et al. | 382/103 |
| 6,470,271 | B2 | * | 10/2002 | Matsunaga | 701/301 |
| 6,507,661 | B1 | * | 1/2003 | Roy | 382/107 |
| 6,853,332 | B1 | * | 2/2005 | Brookes | 342/191 |
| 6,868,314 | B1 | * | 3/2005 | Frink | 701/3 |

(Continued)

OTHER PUBLICATIONS

Call et al. Obstacle Avoidance for Unmanned Air Vehicles Using Image Feature Tracking, AISS Guidance Navigation and Control Conference and Exhibit Aug. 21-24, 2006, pp. 1-9.*

(Continued)

*Primary Examiner* — Bhavesh M Mehta
*Assistant Examiner* — Mia M Thomas
(74) *Attorney, Agent, or Firm* — Fogg & Powers LLC

(57) ABSTRACT

A method and system for obstacle mapping for navigation of an autonomous vehicle is disclosed. The method comprises providing an autonomous vehicle with an image capturing device, and focusing the image capturing device at a predetermined number of different specified distances to capture an image at each of the specified distances. The method further comprises identifying which regions in the captured images are in focus, and assigning a corresponding lens-focus distance to each of the regions that are in focus. A composite image is formed from the captured images, with each of the regions labeled with the corresponding lens-focus distance. A three-dimensional obstacle map is then produced from the composite image. The three-dimensional obstacle map has an x, y, z coordinate system, with x being proportional to pixel horizontal position, y being proportional to pixel vertical position, and z being the lens-focus distance.

20 Claims, 2 Drawing Sheets

U.S. PATENT DOCUMENTS

| | | | | |
|---|---|---|---|---|
| 7,015,855 B1* | 3/2006 | Medl et al. | ............... | 342/25 A |
| 7,027,615 B2* | 4/2006 | Chen | ............... | 382/104 |
| 7,231,294 B2* | 6/2007 | Bodin et al. | ............... | 701/206 |
| 7,298,289 B1* | 11/2007 | Hoffberg | ............... | 340/903 |
| 7,298,922 B1* | 11/2007 | Lindgren et al. | ............... | 382/294 |
| 7,330,567 B2* | 2/2008 | Hong et al. | ............... | 382/103 |
| 7,417,641 B1* | 8/2008 | Barber et al. | ............... | 345/589 |
| 7,440,585 B2* | 10/2008 | Roh et al. | ............... | 382/103 |
| 7,492,965 B2* | 2/2009 | Blais | ............... | 382/284 |
| 7,512,494 B2* | 3/2009 | Nishiuchi | ............... | 701/300 |
| 7,620,265 B1* | 11/2009 | Wolff et al. | ............... | 382/276 |
| 7,865,267 B2* | 1/2011 | Sabe et al. | ............... | 700/245 |
| 2001/0018640 A1* | 8/2001 | Matsunaga | ............... | 701/301 |
| 2001/0040505 A1* | 11/2001 | Ishida et al. | ............... | 340/435 |
| 2002/0105484 A1* | 8/2002 | Navab et al. | ............... | 345/8 |
| 2003/0072479 A1* | 4/2003 | Sofia Totterman et al. | ... | 382/131 |
| 2004/0013295 A1* | 1/2004 | Sabe et al. | ............... | 382/153 |
| 2004/0062419 A1* | 4/2004 | Roh et al. | ............... | 382/104 |
| 2004/0101161 A1* | 5/2004 | Roh et al. | ............... | 382/103 |
| 2004/0158355 A1* | 8/2004 | Holmqvist et al. | ............... | 700/245 |
| 2004/0175019 A1* | 9/2004 | Howard | ............... | 382/103 |
| 2006/0132753 A1* | 6/2006 | Nichols et al. | ............... | 356/5.07 |
| 2007/0019181 A1* | 1/2007 | Sinclair et al. | ............... | 356/4.01 |
| 2007/0023582 A1* | 2/2007 | Steele et al. | ............... | 244/190 |
| 2007/0092143 A1* | 4/2007 | Higgins | ............... | 382/228 |
| 2007/0122058 A1* | 5/2007 | Kitaura et al. | ............... | 382/284 |
| 2007/0285438 A1* | 12/2007 | Kanowitz | ............... | 345/632 |
| 2007/0286456 A1* | 12/2007 | Ariyur et al. | ............... | 382/103 |
| 2007/0286526 A1* | 12/2007 | Abousleman et al. | ............... | 382/284 |
| 2008/0023587 A1* | 1/2008 | Head et al. | ............... | 244/158.4 |
| 2008/0059068 A1* | 3/2008 | Strelow et al. | ............... | 701/214 |
| 2008/0189036 A1* | 8/2008 | Elgersma | ............... | 701/211 |
| 2008/0205790 A1* | 8/2008 | Wear et al. | ............... | 382/284 |
| 2008/0219508 A1* | 9/2008 | Ganguli et al. | ............... | 382/104 |
| 2009/0088916 A1* | 4/2009 | Elgersma et al. | ............... | 701/21 |
| 2009/0154773 A1* | 6/2009 | Pickering et al. | ............... | 382/107 |
| 2009/0198371 A1* | 8/2009 | Emanuel et al. | ............... | 700/226 |
| 2009/0226113 A1* | 9/2009 | Matsumoto et al. | ............... | 382/284 |
| 2009/0228205 A1* | 9/2009 | Ariyur et al. | ............... | 701/209 |
| 2010/0034424 A1* | 2/2010 | Goossen | ............... | 382/103 |
| 2010/0223008 A1* | 9/2010 | Dunbabin et al. | ............... | 701/301 |

OTHER PUBLICATIONS

Conkur et al. The Beam Analysis Algorithm for Path Planning for redundant manipulators Mechatronics 15(2005) pp. 67-94.*

Dolgov et al. Practical Search Techniques in Path Planning for Autonomous Driving American Association for AI 2008, pp. 1-6.*

NPL Search History—Google Scholar pp. 1-2 "Three Dimensional Obstacle Avoidance Algorithm".*

Nourani-Vatani et al. Practical Path Planning and Obstacle Avoidance for Autonomous Mowing, 2006, pp. 1-9.*

The Virginia Tech Autonomous Vehicle Team-Johnny 5, Apr. 27, 2004, pp. 1-15.*

Wahlde et al. An Open Path Obstacle Avoidance Algorithm Using Scanning Laser Range Data, Army Research Labs, Feb. 2009, pp. 1-20.*

Feng et al. Implementation of Dynamic Obstacle Avoidance on the CMU NAVLAB, IEEE—1990, pp. 208-211.*

Borenstein et al. Real Time Obstacle Avoidance for Fast Mobile Robots, 1989 IEEE Systems, Man and Cybernetics vol. 19, No. 5: Sep.-Oct. 1989, pp. 1179-1187.*

Nilsson Visual Landmark Selection and Recognition for Autonomous Unmanned Aerial Vehicle Navigation KTH Numerical Analysis and Computer Science (2005), pp. 1-53.*

Batavia et al. "Obstacle Detection Using Adaptive Color Segmentation and Color Stereo Homography" Carnegie Melon University, IEEE International Conference on Robotics, 2001—pp. 1-6.*

Elfes "Using Occupancy Grids for Mobile Robot Perception and Navigation" IEEE 1989, pp. 1-12.*

WO 2006/021813 A1 Ansell et al. "Collision Avoidance System" pp. 1-24.*

Ghangrekar et al. "A Path Planning and Obstacle Avoidance Algorithm for an Autonomous Robotic Vehicle" UNC Charlotte 2009, pp. 1-103.*

Piepmeier et al. "Uncalibrated Target Tracking with Obstacle Avoidance" Proceedings of the 2000 IEEE International Conf on Robotics and Automation San Fran, CA Apr. 2000, pp. 1-6.*

NPL Search history—obstacle avoidance algorithm pp. 1-3.*

Fu et al. "Uncalibrated Visual Servoing with Obstacle Avoidance Using SQP Method" Proceedings of the 2009 IEEE International Conf on Mechatronics and Automation Aug. 9-12, China, pp. 1-6.*

Khatib et al. "Real Time Obstacle Avoidance for Manipulators and Mobile Robots" 1985 IEEE Proceedings, pp. 1-6.*

European Patent Office, "European Search Report", Jun. 11, 2008, Published in: EP.

Jackson, M. et al., "Airborne Technology for Distributed Air Traffic Management", "IEEE Conference on Decision and Control", Dec. 15, 2005, pp. 3947-3954, Publisher: IEEE.

* cited by examiner

US 7,974,460 B2

METHOD AND SYSTEM FOR THREE-DIMENSIONAL OBSTACLE MAPPING FOR NAVIGATION OF AUTONOMOUS VEHICLES

BACKGROUND

Autonomous vehicles are widely used and include a variety of unmanned ground vehicles, underwater vehicles, and aerospace vehicles, such as robots and unmanned aerial vehicles (UAVs). An autonomous vehicle is required to make decisions and respond to situations completely without human intervention. There are major limitations to the overall performance, accuracy, and robustness of navigation and control of an autonomous vehicle. In order to perform navigation properly, an autonomous vehicle must be able to sense its location, steer toward a desired destination, and avoid obstacles. Various modalities have been used to provide navigation of autonomous vehicles. These include use of the Global Positioning System (GPS), inertial measurements from sensors, and image measurements from cameras.

Smaller UAVs are being developed for reconnaissance and surveillance that can be carried and deployed in the field by an individual or a small group. Such UAVs include micro air vehicles (MAVs) and organic air vehicles (OAVs), which can be remotely controlled. The typical dimension for MAVs is approximately six to twelve inches (15 to 30 cm), and development of insect-size MAVs is underway. Such air vehicles can be designed for operation in a battlefield by troops, and provide small combat teams and individual soldiers with the capability to detect enemy forces concealed in forests or hills, around buildings in urban areas, or in places where there is no direct line-of-sight. Some of these air vehicles can perch and stare, and essentially become sentinels for maneuvering troops.

In order to avoid obstacles during navigation, autonomous vehicles such as UAVs need three-dimensional (3-D) obstacle mapping. Typical vehicle sensors that are used currently are either very expensive (e.g., scanning laser detection and ranging (LADAR)) or require very computationally expensive algorithms (e.g., stereo cameras that try to track many features).

SUMMARY

The present invention is related to a method and system for obstacle mapping for navigation of an autonomous vehicle. The method comprises providing an autonomous vehicle with an image capturing device, and focusing the image capturing device at a predetermined number of different specified distances to capture an image at each of the specified distances. The method further comprises identifying which regions in each captured image are in focus, and assigning a corresponding lens-focus distance to each of the regions that are in focus. A composite image is formed based on each captured image, with each of the regions labeled with the corresponding lens-focus distance. A three-dimensional obstacle map is then produced from the composite image. The three-dimensional obstacle map has an x, y, z coordinate system, with x being proportional to pixel horizontal position, y being proportional to pixel vertical position, and z being the lens-focus distance.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention is directed to a method and system for obstacle mapping for navigation of autonomous vehicles. In general, the method comprises providing an autonomous vehicle with an image capturing device, and focusing the image capturing device at a predetermined number of different specified distances to capture an image at each of the specified distances. The method then identifies which regions in the captured images are in focus, and assigns a corresponding lens-focus distance to each of the regions that are in focus. A composite image is formed from the captured images, with each of the regions labeled with the corresponding lens-focus distance. A three-dimensional (3-D) obstacle map is then produced from the composite image.

The 3-D obstacle mapping can be accomplished using monocular camera autofocus algorithms to produce a two-dimensional (2-D) array of ranges for each of the regions in focus. This information in each of the images is then employed to build a 3-D obstacle map.

The present method and system can be used for obstacle avoidance in an autonomous vehicle such as an unmanned aerial vehicle (UAV), including a micro air vehicle (MAV) or an organic air vehicle (OAV), but are not limited to light payload platforms.

Figure 1:
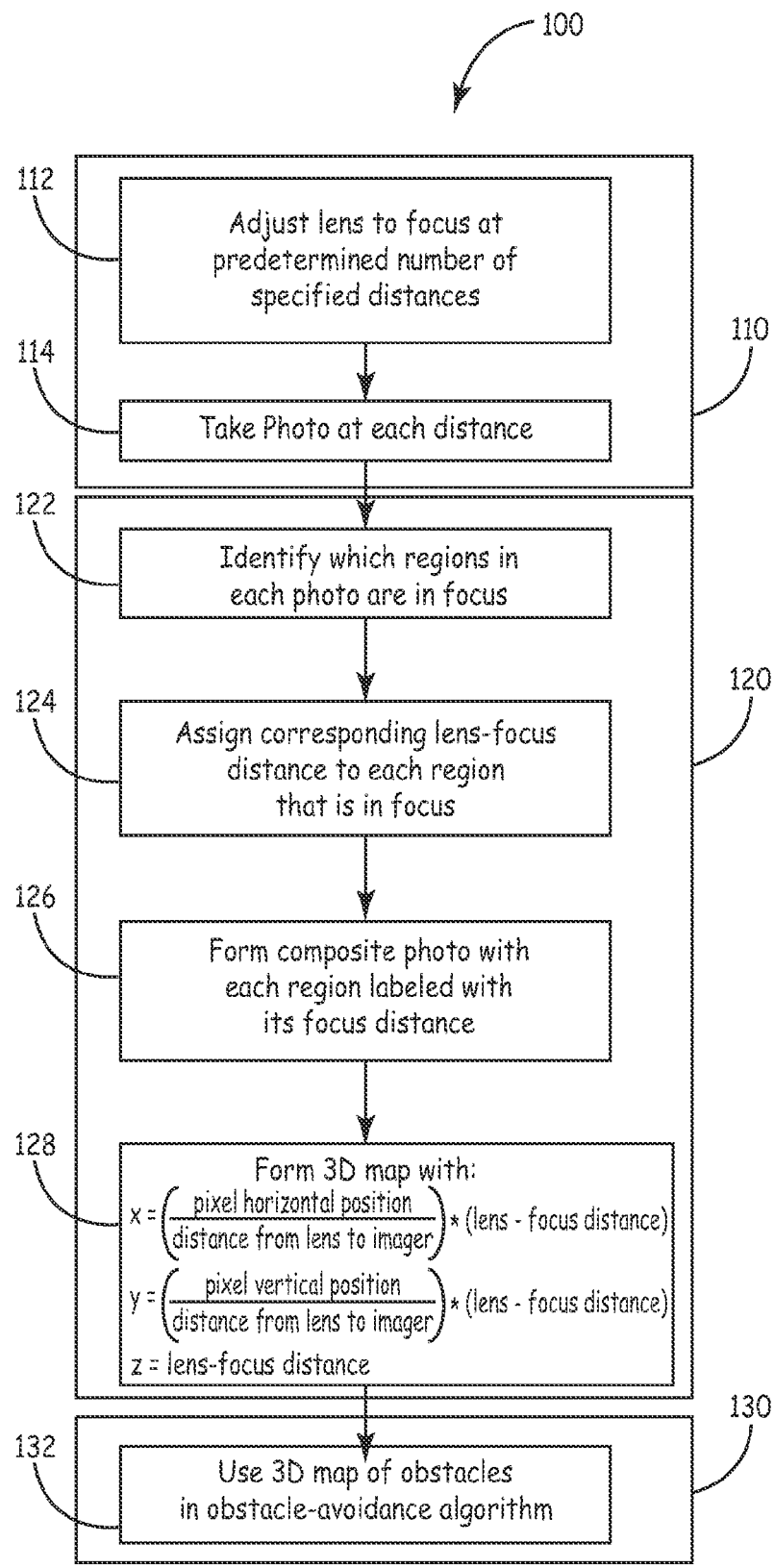
FIG. 1 is a combined flow chart and functional block diagram for an obstacle detection sensor system according to an embodiment of the invention.

FIG. 1 is a combined flow chart and functional block diagram for an obstacle detection and mapping system 100 according to one embodiment of the invention. The system 100 includes an image capturing device 110, such as a digital camera. A mapping module 120, which contains 3-D mapping software, is in operative communication with image capturing device 110. An obstacle avoidance module 130 containing obstacle avoidance software, such as a Laplacian path planning algorithm, is in operative communication with mapping module 120.

Further details related to Laplacian path planning algorithms can be found in copending U.S. patent application Ser. No. 11/470,099, filed on Sep. 5, 2006, the disclosure of which is incorporated herein by reference.

During operation of system 100, the lens of the camera is adjusted to focus at a predetermined number of specified distances (e.g., seven distances) at block 112, and the camera takes a photo (image) at each of these distances (e.g., seven photographs) at block 114. Each of the lens settings for the specified distances is saved in a memory device of the camera, and the photos are downloaded to the mapping module 120 at high speed. The 3-D mapping software in mapping module 120 identifies which regions in each of the photos are in focus (block 122), and assigns a corresponding lens-focus distance to each region that is in focus (block 124). A composite photo is formed with each region labeled with its focus distance (block 126). A 3-D obstacle map is then produced having an x, y, z coordinate system, with $$x = \frac{\text{pixel horizontal position}}{\text{distance from lens to imager}} * (\text{lens} - \text{focus distance})$$

$$y = \frac{\text{pixel vertical position}}{\text{distance from lens to imager}} * (\text{lens} - \text{focus distance})$$

$$z = (\text{lens} - \text{focus distance})$$

(block 128). Thus, x is proportional to pixel horizontal position, y is proportional to pixel vertical position, and z is the lens-focus distance. The 3-D obstacle map is transferred to the obstacle avoidance module 130, which utilizes the 3-D obstacle map in a standard obstacle avoidance algorithm (block 132).

Further details related to implementing the method and system of the invention are set forth hereafter.

Equipment

In one embodiment, the obstacle detection and mapping system can be based on a single digital camera (8.6 megapixel) with full-size imager (e.g., 24 mm by 36 mm imager with 2400*3600=8.6 million pixels) and a normal 50 mm lens. The camera has a focal length (f) of 0.05 m, a pixel width (c) of (24 mm CD width)/(2400 pixels)=10 microns (microns are typical units for measuring pixel size), and an f-number (N) of 3.0. The field of view (FOV)=(24 mm CCD width)/50 mm focal length=30 degrees. The autofocus algorithms in the camera can be used to distinguish range in 6 bins, from about 7 meters to about 45 meters. Typical image compression schemes, such as JPEG, use 4*4 or 8*8 cells of pixels, and information in the JPEG coefficients can be used to determine if that 4*4 or 8*8 region is in focus. This type of range determination can be done for each of (2400/4)*(3600/4)=600*900 subregions, which gives a (30 degrees)/600=0.05 degree angular resolution. Each autofocus cell has 4*4 pixels, and photographs can be taken with six different lens positions within 0.25 sec (24 frames per sec (fps)). This provides z=range for each of the 600*900 (x, y) values in an image, which can be used to generate 3-D obstacle maps.

In another embodiment, the obstacle detection and mapping system can be based on a single 8 megapixel digital single-lens reflex (SLR) camera. Such a system gives seven range bins for an obstacle distance of about 7 m to about 52 m, for each of 400*300 JPEG regions, where each JPEG region contains 8*8 pixels. The only required computation is the JPEG algorithm in the digital camera, and the selection of one high-spatial-frequency coefficient for each 8*8 JPEG region to determine if that region is in focus. An ultrasonic range sensor can be optionally used to augment the camera to determine range to nearby windows or featureless walls. A field of view of about 45 degrees is also needed for obstacle avoidance in this embodiment.

Range Resolution

In determining range resolution, depth information is obtained by using the fact that a wide-aperture and/or long focal-length lens has a small depth-of-field, so a photograph will only be in focus in regions where obstacles are in a given range bin. For example, to determine which areas of a photograph are in focus, each 8*8 cell in a JPEG representation of the photograph is examined. An 8*8 JPEG cell is in focus if-and-only-if it has large coefficients for its highest spatial frequencies. By storing the values of the largest high-spatial-frequency coefficients, an indicator is provided for whether the 8*8 cell of pixels is in focus. By taking a sequence of (e.g., around seven) photographs, with the lens focused at a sequence of distances (e.g., 8 m, 9 m, 11 m, 13 m, 18 m, 31 m, and 52 m), a composite photograph can be constructed that has depth information in seven range bins for each 8*8 pixel area on the composite photograph. Given a high resolution photograph, e.g., 3500*2300 pixels (8 megapixels), a total of (3500/8)*(2300/8)=437*287 JPEG cells with range-bin information can be obtained.

If a camera/lens system is focused at its hyper-focal distance, H, then all viewed objects at distances between H/2 and infinity will be in focus. So the range-from-focus technique that is used in the present method only works out to a distance of H/2. In order to measure range out to 52 m, a camera/lens system with hyper-focal distance of at least H=f*f/(N*c)=104 meters is needed.

Figure 2:
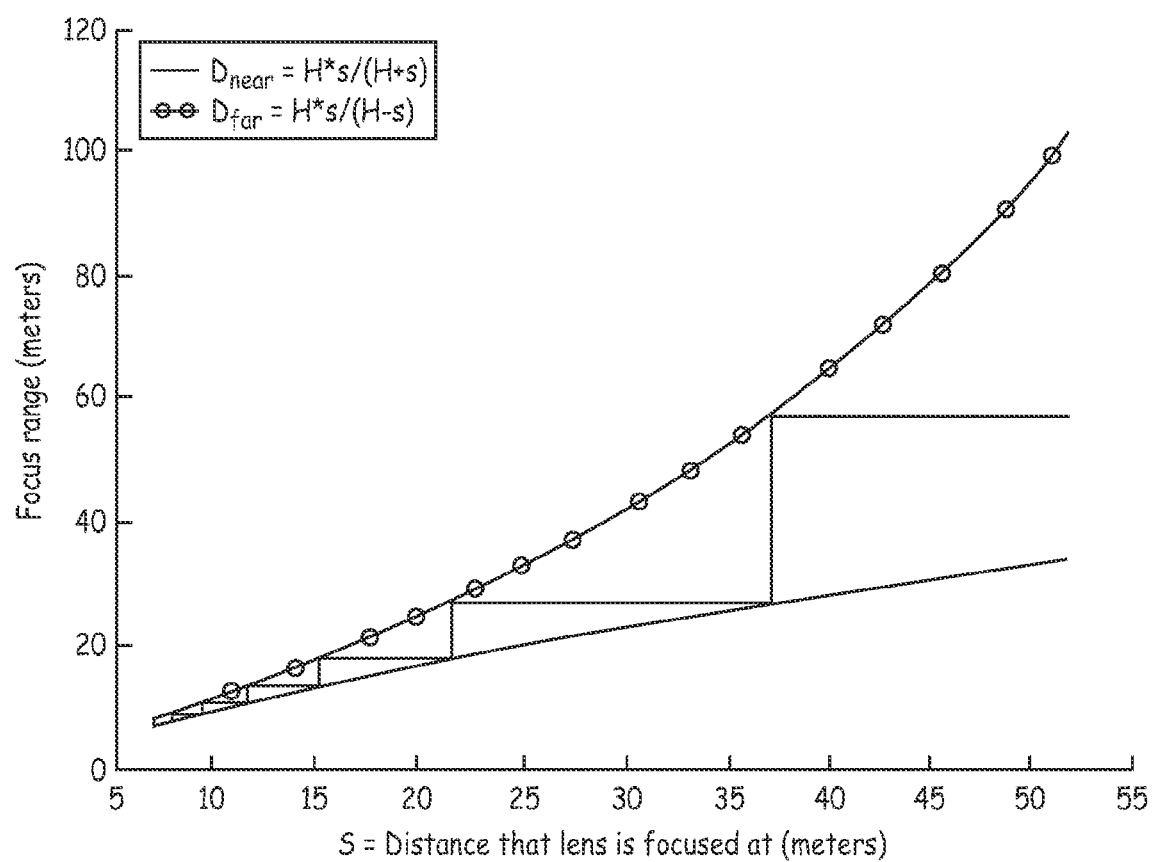
FIG. 2 is a graph showing range binning resolution and accuracy for an obstacle detection sensor system according to an embodiment of the invention.

FIG. 2 is a graph showing range binning resolution and accuracy. The graph plots the maximum and minimum distance that a lens is focused at (s) with respect to nominal focus range, for seven range bins from about 7 m to about 52 m for a camera/lens system with H=104 m. The near distance is determined by $D_{near}$=H*s/(H+s), and the far distance is determined by $D_{far}$=H*s/(H−s). The graph shows that the spread between maximum and minimum focus distance increases rapidly as the focus distance approaches the hyper-focal distance H. The resulting number of bins of distinguishable distances is quite small for ranges approaching the hyper-focal distance, while the number of distinguishable range bins is much larger for closer ranges.

Vibration

On a sunny day, with an F16 lens setting, the shutter speed needs to be approximately the inverse of the ISO settings, so at ISO 100, shutter speed needs to be around 1/100 second. If an F1.8 lens is used, shutter speeds need to be around:

$$(\text{shutter time}) = \left(\frac{1.8}{16}\right)^2 * \left(\frac{1}{100}\sec\right) = \left(\frac{1}{8000}\sec\right)$$

Vibration frequencies are at frequencies of vehicle engine revolutions per minute (RPM) and several higher harmonics. If the vehicle engine RPM is around 6000 RPM=100 Hz, the fraction of an engine revolution undergone during the time that the shutter is open is:

(shutter time)*(engine rate)=((1/8000)sec)*(100 Hz)=1/80<<1

Thus, any vibrations should not blur the photographs.

Sensor Update Rate

An additional requirement for good obstacle avoidance for MAV or OAV type vehicles is an obstacle-sensor update rate of about 1 Hz. Digital SLR cameras with frame rates of at least 5 Hz (5 fps) can be used to provide this capability. This would allow a sequence of seven photos to be updated at (5 fps)/(7 frames)=0.7 Hz. For example, when the 5 fps speed of a Canon EOS-20D is in burst mode, the photographs are stored into the camera's fast memory buffer. The present method only needs to transfer a small fraction (e.g., 1/(8*8)= 1/64, since 8*8 cells of pixels are grouped) of that data out to an obstacle-avoidance algorithm, since collision avoidance does not need the full angular resolution of a digital SLR camera. With a USB2 data transfer between the camera and a computer, a full 8 megapixel image can be transferred in about 0.5 seconds. Since the present method only transfers 1/64 of the detail in the image (one byte per 8*8 pixel JPEG region, needed for range determination), the time needed to transfer range data from 1 frame is: (0.5 sec/full frame)*(1/64)=0.008 sec.

Example Calculations

To determine the feasibility of using a digital SLR camera for building a 3-D obstacle map, the following example calculates hyper-focal distance and field of view for the camera described in the previous section. Camera: Canon EOS-20D, 3500*2300 pixel 22.5 mm×15 mm CCD (pixel width=6.5 micron). Lens: Sigma f=30 mm, f–number=1.4, EX DC HSM with Canon mount. The hyper-focal distance, H, and field of views are calculated as follows:

$$H = \frac{f^2}{(F \text{ number}) * (\text{pixel width})} = \frac{(0.030 \text{ m})^2}{1.4 * 6.5 * 10^{-6} \text{ m}} = 99 \text{ m}$$

$$\text{Horizontal field of view} = 2 * \tan^{-1}\left(\frac{(22.5 \text{ mm})/2}{30 \text{ mm}}\right) = 41 \text{ degrees}$$

$$\text{Vertical field of view} = 2 * \tan^{-1}\left(\frac{(15 \text{ mm})/2}{30 \text{ mm}}\right) = 28 \text{ degrees}.$$

Instructions for carrying out the various process tasks, calculations, and generation of signals and other data used in the operation of the method and system of the invention can be implemented in software, firmware, or other computer readable instructions. These instructions are typically stored on any appropriate computer readable media used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code means in the form of computer executable instructions or data structures. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented in computer readable instructions, such as program modules, being executed by a processor. Generally, program modules include routines, programs, objects, data components, data structures, algorithms, etc. that perform particular tasks or implement particular abstract data types. Computer executable instructions, associated data structures, and program modules represent examples of program code means for executing steps of the methods disclosed herein. The particular sequence of such executable instructions or associated data structures represents examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of obstacle mapping for navigation of an autonomous vehicle, the method comprising:
   providing an autonomous vehicle with an image capturing device;
   focusing the image capturing device at a predetermined number of different specified distances to capture an image at each of the specified distances;
   identifying which regions in each captured image are in focus;
   assigning a corresponding lens-focus distance to each of the regions that are in focus;
   forming a composite image based on each captured image, with each of the regions labeled with the corresponding lens-focus distance; and
   producing a three-dimensional obstacle map from the composite image, wherein the three-dimensional obstacle map has an x, y, z coordinate system, with x being proportional to pixel horizontal position, y being proportional to pixel vertical position, and z being the lens-focus distance.

2. The method of claim 1, further comprising employing the three-dimensional obstacle map in an obstacle avoidance algorithm.

3. The method of claim 2, wherein the obstacle avoidance algorithm comprises a Laplacian path planning algorithm.

4. The method of claim 1, further comprising producing a two-dimensional array of ranges for each of the regions that are in focus prior to producing the three-dimensional obstacle map.

5. The method of claim 1, wherein the autonomous vehicle comprises an unmanned aerial vehicle.

6. The method of claim 5, wherein the unmanned aerial vehicle comprises a micro air vehicle, or an organic air vehicle.

7. The method of claim 1, wherein the image capturing device comprises a digital camera.

8. The method of claim 7, wherein the digital camera provides seven range bins for an obstacle distance from 7 m to 52 m.

9. An obstacle detection and mapping system, comprising:
   an image capturing device configured to focus at a predetermined number of different specified distances to capture an image at each of the specified distances;
   a mapping module in operative communication with the image capturing device, wherein the mapping module has instructions to:
      identify which regions in each captured image are in focus;
      assign a corresponding lens-focus distance to each of the regions that are in focus;
      form a composite image based on each captured image, with each of the regions labeled with the corresponding lens-focus distance; and
      produce a three-dimensional obstacle map from the composite image, wherein the three-dimensional obstacle map has an x, y, z coordinate system, with x being proportional to pixel horizontal position, y being proportional to pixel vertical position, and z being the lens-focus distance; and
   an obstacle avoidance module in operative communication with the mapping module.

10. The system of claim 9, wherein the image capturing device comprises a digital camera.

11. The system of claim 10, wherein the digital camera is configured to provide seven range bins for an obstacle distance from 7 m to 52 m.

12. The system of claim 9, wherein the obstacle avoidance module has instructions to employ the three-dimensional obstacle map in an obstacle avoidance algorithm.

13. The system of claim 12, wherein the obstacle avoidance algorithm comprises a Laplacian path planning algorithm.

14. An autonomous vehicle comprising the obstacle detection system according to claim 9.

15. The autonomous vehicle of claim 14, wherein the vehicle comprises an unmanned aerial vehicle.

16. The autonomous vehicle of claim 15, wherein the unmanned aerial vehicle comprises a micro air vehicle, or an organic air vehicle.

17. A non-transitory computer readable medium having instructions stored thereon for a method of obstacle mapping for navigation of an autonomous vehicle, the method comprising:
focusing an image capturing device at a predetermined number of different specified distances from an autonomous vehicle to capture an image at each of the specified distances;
identifying which regions in each captured image are in focus;
assigning a corresponding lens-focus distance to each of the regions that are in focus;
forming a composite image based on each captured image, with each of the regions labeled with the corresponding lens-focus distance; and
producing a three-dimensional obstacle map from the composite image, wherein the three-dimensional obstacle map has an x, y, z coordinate system, with x being proportional to pixel horizontal position, y being proportional to pixel vertical position, and z being the lens-focus distance.

18. The non-transitory computer readable medium of claim 17, wherein the method further comprises employing the three-dimensional obstacle map in an obstacle avoidance algorithm.

19. The non-transitory computer readable medium of claim 18, wherein the obstacle avoidance algorithm comprises a Laplacian path planning algorithm.

20. The non-transitory computer readable medium of claim 17, wherein the method further comprises producing a two-dimensional array of ranges for each of the regions that are in focus prior to producing the three-dimensional obstacle map.

* * * * *